United States Patent Office 3,053,827
Patented Sept. 11, 1962

3,053,827
4-SULFANILAMIDO-2,6-DIHALOPYRIMIDINE DERIVATIVES
Bernard William Langley, Macclesfield, England, assignor to Imperial Chemical Industries Limited, London, England, a corporation of Great Britain
No Drawing. Filed Oct. 29, 1959, Ser. No. 849,444
Claims priority, application Great Britain Dec. 8, 1958
6 Claims. (Cl. 260—154)

This invention relates to organic compounds and more particularly it relates to pyrimidine derivatives which are useful as intermediates in the preparation of compounds possessing therapeutic properties.

According to the invention I provide pyrimidine derivatives of the formula:

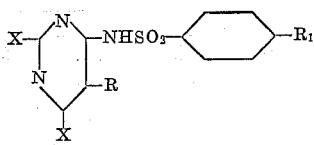

wherein X stands for a halogen atom, R stands for hydrogen or for a lower alkyl radical and $R_1$ stands for an amino group or for a group which can be converted into an amino group.

As suitable halogen atoms there may be mentioned for example chlorine and bromine and a suitable lower alkyl radical (R) may be a methyl radical. As suitable substituents ($R_1$) capable of conversion into an amino group for example by hydrolysis there may be mentioned for example an acylamino radical of the formula —$NHCOR_2$ or an alkoxycarbonylamino radical of the formula —$NHCOOR_2$ wherein $R_2$ stands for an alkyl radical. Suitable substituents ($R_1$) capable of conversion into an amino group for example by reduction may be for example a nitro group or an arylazo radical of the formula —N=N.$R_3$ wherein $R_3$ stands for an aryl radical. Particular substituents ($R_1$) are the acetamido, nitro, ethoxycarbonylamino and phenylazo radicals.

A particularly valuable compound for use as an intermediate is 2:6-dichloro-4-(p-acetylaminobenzenesulphonamido) pyrimidine.

According to a further feature of the invention I provide a process for the manufacture of the said pyrimidine derivatives which comprises interaction of a halogenopyrimidine of the formula:

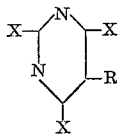

wherein X and R have the meanings stated above, and a sulphonamide derivative of the formula:

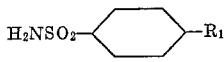

wherein $R_1$ has the meaning stated above, or a metal salt thereof.

As a suitable metal salt of the said sulphonamide derivative there may be mentioned for example an alkali metal salt for example the sodium or potassium salt.

The reaction is conveniently carried out by mixing or heating the reactants together in the presence of an inert diluent or solvent for example dimethylformamide, dimethylsulphoxide or aqueous acetone.

As stated above the compounds of this invention are useful as intermediates in the preparation of compounds possessing therapeutic properties. They may be used for the preparation of 2:6-dimethoxy-4-(p-aminobenzenesulphonamido) pyrimidine and related compounds by reaction with sodium or potassium methoxide, ethoxide, methylmercaptide or ethylmercaptide and the compounds so obtained are valuable for use as antibacterial agents.

The invention is illustrated but not limited by the following example in which the parts are by weight:

Example 1

A mixture of 11.8 parts of the sodium salt of p-acetamidobenzenesulphonamide, 100 parts of dimethylformamide and 4.8 parts of 2:4:6-trichloropyrimidine is shaken at 20° C. during 15 minutes. The mixture is then kept at 20° C. for a further 16 hours and the solvent is then removed in vacuo. 75 parts of water at 50° C. are added to the residue and the mixture is stirred for 5 minutes and then cooled in ice for 30 minutes and filtered. The filtrate is acidified with dilute aqueous hydrochloric acid and the mixture is filtered. The solid residue is crystallised from aqueous ethanol and there is thus obtained 2:6-dichloro-4-(p-acetylaminobenzenesulphonamido) pyrimidine, M.P. 236–239° C.

Example 2

A solution of 4.8 parts of 2:4:6-trichloropyrimidine in 80 parts of acetone is added to a solution of 10.7 parts of p-acetamidobenzenesulphonamide and 2 parts of sodium hydroxide in 100 parts of water. The mixture is then heated under reflux during 1 hour and the acetone is removed by distillation. The residual solution is cooled and filtered and the filtrate is acidified with dilute aqueous hydrochloric acid. The mixture is filtered and the solid residue is crystallised from aqueous ethanol. There is thus obtained 2:6-dichloro-4-(p-acetylaminobenzene sulphonamido)pyrimidine, M.P. 236–239° C.

Example 3

4.8 parts of 2:4:6-trichloropyrimidine are added to a mixture of 10.1 parts of the sodium salt of p-nitrobenzenesulphonamide and 100 parts of dimethylformamide at 20° C. The mixture is shaken for 10 minutes and the solvent is evaporated in vacuo. The residue is stirred with 20 parts of water and is then kept at 0° C. for 30 minutes. The mixture is then filtered and the filtrate is acidified with dilute aqueous hydrochloric acid. The mixture is filtered and the solid residue is crystallised from aqueous ethanol. There is thus obtained 2:6-dichloro-4-(p-nitrobenzenesulphonamido)-pyrimidine as a colourless crystalline solid, M.P. 173° C.

Example 4

13.2 parts of a 76.6% aqueous paste of p-acetylaminobenzenesulphonamide are added to 50 parts of 4% w./v. aqueous sodium hydroxide solution and the mixture is evaporated to dryness in vacuo. To the residue are added 100 parts of dimethylsulphoxide and 4.8 parts of 2:4:6-trichloropyrimidine and the mixture is heated at 100° C. for 30 minutes. The reaction mixture is then evaporated to dryness in vacuo and 75 parts of water are added to the residue. The mixture is cooled to 0° C. and filtered and the filtrate is acidified to pH 1–2 with concentrated hydrochloric acid. The precipitated solid is separated by filtration and is crystallised from aqueous ethanol. There is thus obtained 2:6-dichloro-4-(p-acetylaminobenzenesulphonamido)pyrimidine, M.P. 236–239° C.

Example 5

11.3 parts of the sodium salt of p-phenylazobenzenesulphonamide and 3.7 parts of 2:4:6-trichloropyrimidine are dissolved in 52 parts of dimethylformamide and the mixture is heated at 100° C. for one hour. The reaction mixture is then evaporated to dryness in vacuo, 100 parts of water are added to the residue, and the mixture is cooled to 0° C. and filtered. The filtrate is acidified to pH 1–2 with concentrated hydrochloric acid and the mixture is filtered. The solid residue is crystallised from aqueous ethanol and there is obtained 2:6-dichloro-4-(p-phenylazobenzenesulphonamido)pyrimidine, M.P. 224–226° C.

*Example 6*

12.2 parts of p-ethoxycarbonylaminobenzenesulphonamide are added to 50 parts of 4% w./v. aqueous sodium hydroxide solution, and the mixture is evaporated to dryness in vacuo. 52 parts of dimethylformamide and 4.6 parts of 2:4:6-trichloropyrimidine are added to the residue and the mixture is heated at 100° C. for 30 minutes.

The solvent is removed by evaporation in vacuo and 70 parts of water are added to the residue. The mixture is cooled to 0° C. and filtered and the filtrate is acidified to pH 1–2 with concentrated hydrochloric acid. The mixture is filtered and the solid residue is crystallised from aqueous ethanol and there is obtained 2:6-dichloro-4-(p-ethoxycarbonylaminobenzenesulphonamido) pyrimidine, M.P. 233–234° C.

*Example 7*

7.9 parts of 5-methyl-2:4:6-trichloropyrimidine and 18.9 parts of the sodium salt of p-acetamidobenzenesulphonamide are dissolved in 132 parts of dimethylformamide, and the mixture is heated to 100° C. for 30 minutes. The reaction mixture is evaporated to dryness in vacuo and 125 parts of water are added to the residue. The mixture is cooled to 0° C. and is acidified with aqueous hydrochloric acid and is then filtered. The solid residue is crystallised from aqueous ethanol and there is thus obtained 2:6-dichloro-4-(p-acetamidobenzenesulphonamido)-5-methylpyrimidine, M.P. 243–244° C.

What I claim is:
1. Pyrimidine derivatives of the formula:

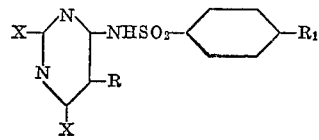

wherein X is a halogen atom, R is selected from the group consisting of hydrogen and lower alkyl and $R_1$ is selected from the group consisting of amino, acetamido, alkoxycarbonylamino, nitro and phenylazo.

2. The compound 2:6-dichloro-4-(p-acetylaminobenzenesulphonamido)pyrimidine.
3. The compound 2:6-dichloro-4-(p-nitrobenzenesulphonamido)-pyrimidine.
4. The compound 2:6-dichloro-4-(p-phenylazobenzenesulphonamido)pyrimidine.
5. The compound 2:6-dichloro-4-(p-ethoxycarbonylaminobenzenesulphonamido)pyrimidine.
6. The compound 2:6-dichloro-4-(p-acetamidobenzenesulphonamido)-5-methylpyrimidine.

References Cited in the file of this patent
UNITED STATES PATENTS

| | | |
|---|---|---|
| 2,403,776 | Winnek | July 9, 1946 |
| 2,471,772 | Pickholz et al. | May 31, 1949 |
| 2,494,524 | Sprague | Jan. 10, 1950 |
| 2,553,093 | Jacob et al. | May 15, 1951 |
| 2,712,012 | Clark | June 28, 1955 |
| 2,792,391 | Mueller et al. | May 14, 1957 |

FOREIGN PATENTS

| | | |
|---|---|---|
| 926,131 | Germany | Apr. 7, 1955 |
| 308,691 | Switzerland | Oct. 1, 1955 |
| 236,173 | Switzerland | June 1, 1945 |
| 1,203,619 | France | Jan. 20, 1960 |
| 552,228 | Canada | Jan. 28, 1958 |

OTHER REFERENCES

Rose et al., Journal Chemical Society (London), 1946, pages 81–85.

Wiselogle: Survey of Antimalarial Drugs, J. W. Edwards, Ann Arbor, vol. II, part 2, pp. 1416–1417 (1946).

Boarland et al., J. Chem. Soc., vol. 1952, pp. 3722–3725 (1952).

Smith et al., Journal Organic Chemistry, vol. 20, pp. 829–838, pp. 829–30 relied on (1955).